3,350,474
PRODUCTION OF CONJUGATED DIOLEFINES
Max Marin Wirth, Dollar, Scotland, assignor, by mesne assignments, to British Hydrocarbon Chemicals Limited, London, England
No Drawing. Filed July 12, 1965, Ser. No. 471,455
Claims priority, application Great Britain, Feb. 20, 1959, 5,985/59; June 18, 1959, 20,883/59; Feb. 27, 1961, 7,184/61
9 Claims. (Cl. 260—681)

The present invention relates to the production of conjugated diolefines by the decomposition of 1,3-dioxanes. This application is a continuation-in-part of my application Ser. No. 174,414, filed Feb. 20, 1962 and of my application Ser. No. 266,166, filed Mar. 19, 1963, which is a continuation of my application Ser. No. 7,090, filed Feb. 8, 1960.

The production of conjugated diolefines from 1,3-dioxanes, which are substituted at least once in the 4-position with an alkyl radical, by contacting the dioxanes at an elevated temperature in the vapour phase with a catalyst, is known.

The aim of the present invention is to provide an improved process for the conversion of 1,3-dioxanes to conjugated diolefines.

According to the present invention, the process for the production of a conjugated diolefine comprises contacting a 1,3-dioxane as hereinbelow defined at an elevated temperature of about 200° C. to 450° C. in the vapour phase with boron phosphate or aluminium phosphate. The crystal structure of boron phosphate and aluminium phosphate is, according to Van Wazer, "Phosphorus and Its Compounds," pp. 550–553, isostructural with one or more forms of $SiO_2$. Not only is the phosphorus surrounded by a tetrahedron of oxygen atoms, but so are the boron and aluminum. These crystals are more properly thought of as mixed anhydrides of $P_2O_5$ and alumina or $P_2O_5$ and boria than as an aluminum or boron salt of orthophosphoric acid.

These phosphates are non-acid acting catalysts which are not ordinary salts of phosphoric acid and which are intimate combinations of boron oxide or aluminium oxide with phosphorus oxide. By non-acid acting catalyst is meant a catalyst which is non-hydrolysable complex. The boron and aluminium phosphate are insoluble and do not hydrolyse in cold water.

Preferably the 1,3-dioxane is brought into contact with the catalyst in admixture with steam or other unreactive diluent such as nitrogen or butane.

The starting materials for the process of the present invention are 1,3-dioxanes of the formula

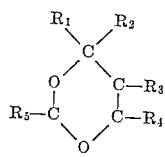

wherein $R_1$ is an alkyl radical having from 1 to 6 carbon atoms, and $R_2$, $R_3$, $R_4$ and $R_5$ are hydrogen, or alkyl radicals having 1 to 6 carbon atoms. The use of 4,4-dimethyl-1,3-dioxane is preferred. The 1,3-dioxane starting material may be prepared by reacting an olefinic hydrocarbon with an aldehyde in the presence, for example, of an aqueous sulphuric acid catalyst. Thus, 4,4-dimethyl-1,3-dioxane may be produced by the reaction of isobutene with formaldehyde in the presence of such a catalyst. In the case of 1,3-dioxanes prepared by reacting an olefine with an aldehyde the radicals $R_4$ and $R_5$ will be identical.

The catalyst which can be used in the process of the present invention are boron phosphate and aluminium phosphate, boron phosphate being particularly preferred. Boron and aluminium phosphates are not ordinary salts of phosphoric acid but are mixed oxides of borons and phosphorus or of aluminium and phosphorus closely related to silica in structure. These compounds may be prepared in any suitable or desired manner which per se forms no part of the present invention and during use may be deposited on a high-surface area inert solid support, such as silica, diatomaceous earths (e.g. Celite), alumina, silica/alumina, fuller's earth. Silica gel or a diatomaceous earth such as Celite are preferred. The boron phosphate and aluminium phosphate may be deposited on a support by impregnating the support with a solution or solutions of compounds giving boron phosphate or aluminium phosphate on drying the impregnated support.

We have found that particularly useful catalysts prepared by impregnation are those containing at least 5% by weight and preferably between 5 and 25% by weight of the boron phosphate or aluminium phosphate deposited on a support. A particularly preferred catalyst contains between 5 and 25% of boron phosphate deposited on silica gel, which silica gel may advantageously contain minor amounts of combined sodium.

Boron phosphate may also be deposited on a support by mixing boron phosphate particles with the support. This may be done by mixing the boron phosphate particles with particles of the support or by mixing the boron phosphate particles with a liquid phase which is then converted to a gel which forms the support.

The quantity of boron phosphate particles mixed with a support should preferably be not less than 5% by weight of the support.

When the dioxane is passed over the catalyst in the presence of steam, boron phosphate particles mixed with a support show improved resistance to prolonged operation and to high temperature regeneration. In particular, there is much less tendency for the reaction selectivity of the catalyst to decline in use after a number of regenerations, as is the case when the boron phosphate is deposited on the support by impregnation, and especially there is little or no tendency for the proportion of isobutene to isoprene formed to increase with catalyst use when cracking 4,4-dimethyl-1,3-dioxane.

The reaction may be carried out over a wide range of temperatures, for instance between 200 and 450° C. The space velocity of the reactant over the catalyst may likewise vary, and is suitably between about 0.1 to 100 liquid volumes of 1,3-dioxane per volume of catalyst per hour. The optimum velocity will vary depending on the reaction temperature, and the particular catalyst in use. It is preferably adjusted so that the conversion of the dioxane is substantially complete. The reaction may be carried out at atmospheric pressure, or increased or reduced pressures may be used.

For the process according to the invention the known methods of vapour phase catalysis may be employed. The catalyst may be a stationary or moving bed or a fluidised bed method may be used.

The diolefines can be recovered from the gaseous reaction product in any suitable manner, for instance by condensing the product followed by fractional distillation of the resulting liquid mixture. Durng the decomposition equimolar amounts of the original aldehyde are formed in producing the diolefine, together with small amount of the original olefine from which the dioxane was made and these may be recovered and re-used in the formation of the dioxane.

A variety of conjugated diolefines can be produced by the process of the invention, including isoprene, from 4,4-dimethyl-1,3-dioxane.

The diolefines made in accordance with this invention are valuable chemical intermediates, for instance in the preparation of synthetic rubbers.

The process of the invention is further illustrated with reference to the following examples.

*Example 1*

A boron phosphate catalyst was prepared as follows: Silica gel of area about 300 m²g., having an average pore diameter of 80 angstrom units and containing 1% of combined sodium was ground and sieved to 30–44 mesh B.S.S. Then 230 g. of this sieved silica gel was impregnated with a solution of 26.4 g. 89.5% $H_3PO_4$ and 14.9 g. crystalline boric acid in 145 ml. water. The impregnation was carried out at about 60–80° C. The impregnated gel was dried at 200° C. for 1 hour.

The catalyst was used in run A of Table 1, in which a mixture of water and the 4,4-dimethyl-1,3-dioxane in a liquid volume ratio of 1.8:1 to 2.1:1 was pumped through a vaporizer and over 5 cc. of the boron phosphate catalyst at 400° C. with an average space velocity of 251 total moles per litre catalyst per hour. The product was condensed and separated into two layers. The aqueous layer contained formaldehyde while the organic layer contained isoprene together with impurities and unconverted dimethyl-dioxane.

By way of comparison with this example, the process was repeated using a known sodium phosphate-butylamine phosphate-graphite catalyst, prepared in the following manner:

100 parts by weight of anhydrous primary sodium phosphate were dissolved in 40 parts by weight of water and mixed with 8 parts by weight of primary n-butylamine phosphate together with 20 parts by weight of graphite. The product was evaporated while stirring and the solidified mass was heated to 160° C. After cooling, the mass was ground to 22–60 mesh B.S.S. This catalyst was used in run B of Table 1, in which the reaction conditions were the same as those in run A, except that it was necessary to use a considerably lower space velocity in order to secure a reasonable conversion.

TABLE 1

| Catalyst used | A<br>10% boron phosphate on silica gel | B<br>Primary sodium and n-butylamine phosphates on graphite |
|---|---|---|
| Water, dioxane liquid volume ratio | 2.1 | 2.0 |
| Feed space velocity, moles total feed/litre catalyst/hr | 251 | 118 |
| Dioxane converted, percent | 93 | 45 |
| Isoprene formation rate, g./litre catalyst/hr | 808 | 102 |
| Isoprene formation efficiency, percent [1] | 75 | 40 |
| Formaldehyde recovery, percent [1] | 119 | 62 |
| Isobutene recovery, percent [2] | 22 | 5 |

[1] As a percentage of the theroretical based on the decomposition of 1 mole dioxane to 1 mole isoprene plus 1 mole formaldehyde.
[2] As a percentage of the theoretical based on the decomposition of 1 mole dioxane to 1 mole isobutene plus 2 moles formaldehyde.

In each case, the results are based on analysis of the products from the fourth hour on stream.

It may be seen from the results in Table 1 that the boron phosphate catalyst was very much more active than the other. Further, it is more efficient for the production of isoprene, and 97% of the dioxane converted has in the example quoted, formed either the desired products or other products reusable in the process, namely isobutene and formaldehyde. A formaldehyde recovery of over 100% is accounted for by the fact that two molecules of formaldehyde are formed when the dimethyldioxane decomposes to give isobutene and formaldehyde.

*Example 2*

A series of catalysts containing varying proportions of boron phosphate deposited on silica gel was prepared by impregnating silica gel of surface area about 300 m.²/g., having an average pore diameter of 83 A. and containing 1% of combined sodium, with aqueous solutions of phosphoric and boric acids, drying the resulting catalyst at 120° C. for 2 hours and calcining at 550° C. for one hour.

Each of the above catalysts was used in a process in which a mixture of two liquid volumes of water with one liquid volume of 4,4-dimethyl-1:3-dioxane was passed in the vapour phase, at 400° C. and atmospheric pressure, over the catalyst. The results are shown in Table 2.

TABLE 2

| Run No | 1 | 2 | 3 | 4 | 5 | 6 |
|---|---|---|---|---|---|---|
| Wt. percent boron phosphate on catalyst | 0.5 | 1.0 | 2.0 | 5 | 10 | 40 |
| Space velocity moles total reactants, litre/catalyst/hour | 236 | 256 | 242 | 238 | 232 | 245 |
| Duration of test, hours | 4 | 4 | 4 | 4 | 4 | 4 |
| Dioxane conversion, percent | 43 | 65 | 86 | 98 | 100 | 100 |
| Products formed, moles/100 moles dioxane converted: | | | | | | |
| Isoprene | 11 | 11 | 18 | 51 | 71 | 77 |
| Isobutene | 24 | 43 | 64 | 44 | 22 | 24 |
| Formaldehyde | 67 | 87 | 119 | 128 | 99 | 116 |

From Table 2 it may be seen that both dioxane conversion and isoprene formation efficiency increase rapidly with increasing content of boron phosphate in the catalyst until a boron phosphate content of 5% by weight is reached, when the conversion is almost complete. Isoprene efficiencies continue to increase, but the increase is not so rapid above 10% boron phosphate content.

*Example 3*

An unsupported boron phosphate catalyst was prepared as follows:

164 parts by weight of 89.5% phosphoric acid were mixed with 49 parts by weight of fused boric acid and 22 parts by weight of water, and the mixture was allowed to stand for 48 hours, to form a gel. The product was dried for 4 hours at 110° C., after which it was crushed and sieved to 22–60 mesh B.S.S.

4:4-dimethyl-1:3-dioxane and water in the vapour phase were passed over the catalyst at a temperature of 400° C., in the ratio of one liquid volume of the dioxane to two liquid volumes of water. The duration of the test was four hours, and the feed space velocity was 40 moles total feed per litre of catalyst per hour. The products obtained and the dioxane conversion for the total four hours, and for the fourth hour only are summarised in Table 3, from which it can be seen that this catalyst has a considerable selective effect for the production of isoprene from this starting material.

TABLE 3

| | 4th hour only | Total 4 hours |
|---|---|---|
| Dioxane conversion, percent | 60 | 81 |
| Products, moles/100 moles dioxane converted: | | |
| Isoprene | 71 | 61 |
| Isobutene | 11 | 15 |
| Formaldehyde | 76 | 69 |

Example 4

A catalyst consisting of aluminium phosphate supported on silica gel was prepared as follows:

40 g. of silica gel as used in Examples 1 and 2 was impregnated with 10 ml. of a 40% aluminium phosphate solution ($Al_2O_3/P_2O_5$ ratio=⅓) diluted to 25 ml. with water. The impregnated gel was dried for 2 hours at 120° C. and calcined for 1 hour at 550° C. This catalyst was tested in the cracking of 4,4-dimethyl-1,3 dioxane under the following conditions:

Duration of test, one hour.
Temperature, 400° C.
Pressure, atmospheric.
Water: dioxane, liquid volume ratio, 2:1.
Feed space velocity, 273 moles total feed/litre catalyst/hr.

Conversion of the dioxane was substantially complete, and the products formed, expressed as moles per 100 moles of dioxane converted were: isoprene 74, isobutene 26, formaldehyde 107.

Example 5

Unsupported mixed boron and aluminium phosphate catalysts were prepared by stirring crystalline boron phosphate (20 c.c.) with 10 ml., 20 ml., and 30 ml., respectively, of the 40% aluminium phosphate solution described in Example 4 above, and drying and calcining the product in the same manner as described for the supported aluminium phosphate catalyst in that example.

The catalysts were crushed and sieved to 22-60 mesh B.S.S. and tested under the same conditions as those described in Example 4. The results are summarised in Table 4.

TABLE 4

| Catalyst | Boron phosphate, 10 ml. aluminium phosphate solution | Boron phosphate, 20 ml. aluminium phosphate solution | Boron phosphate, 30 ml. aluminium phosphate solution |
| --- | --- | --- | --- |
| Dioxane conversion, percent | 56 | 61 | 84 |
| Products, moles/100 moles dioxane converted: | | | |
| Isoprene | 51 | 67 | 364 |
| Isobutene | 2 | 7 | 17 |
| Formaldehyde | 80 | 100 | 118 |

Example 6

A feed of 4,4-dimethyl-1,3 dioxane with an equal liquid volume of water was passed in the gas phase at 350° C. and atmospheric pressure over a support containing boron phosphate, the conversion of the dioxane being substantially complete. The catalyst was regenerated with air at a temperature below 500° C. after producing approximately 9 pts. by weight of isoprene per part of catalyst. The isoprene, isobutene and formaldehyde formed in each test period were measured. The catalyst was silica gel impregnated with 10% by weight of boron phosphate. This catalyst was prepared as follows:

230 gm. of silica gel was impregnated with 145 cc. of an aqueous solution containing 26.4 g. of 89.5% phosphoric acid and 14.9 g. of boric acid. Both the gel and the solution were heated to 60° C. before mixing in order to hold the boric acid in solution. After thorough mixing the catalyst was dried for one hour at 200° C.

The results from this test are shown in the following Table 5.

TABLE 5.—CLEAVAGE OF 4,4-DIMETHYL-1,3 DIOXANE ON BORON PHOSPHATE-SILICA GEL CATALYST

Impregnated catalyst, 10% boron phosphate on silica gel (F.P. 1,247,778)

| Isoprene make in Period, gms./gm. cat. | Cumulative isoprene make, g./gm. cat. | Products, moles/100 moles dioxane converted | | |
| --- | --- | --- | --- | --- |
| | | Isoprene | Isobutene | HCHO |
| 9.4 | 9.4 | 63.7 | 21.4 | 113 |
| 9.1 | 18.5 | 62 | 21.1 | 112 |
| 8.1 | 26.6 | 58.2 | 21.2 | 109 |
| 7.9 | 34.4 | 58.2 | 24.4 | 111 |
| 7.3 | 41.8 | 53.5 | 27.4 | 113 |

Example 7

A boron phosphate/silica gel catalyst was made by mixing together a commercial crystalline boron phosphate powder, with commercial silica gel having the following characteristics: Mesh size 22-60 B.S.S., surface area 300 m.²/g., pore volume 1.04 cc./g., sodium 0.04%, sulphate 0.02%. The boron phosphate powder used amounted to 10% w./w. of the silica gel.

The catalyst was used in a process in which a mixture of two liquid volumes of water with one liquid volume of 4,4-dimethyl-1,3 dioxane was passed in the vapour phase at 400° C. and atmospheric pressure, over the catalyst. The results are shown in Table 6, run 1, for the first hour's operation, and in run 2 for the fourth hour.

TABLE 6

| Run No. | 1 | 2 |
| --- | --- | --- |
| Percent boron phosphate in catalyst | 10 | 10 |
| Feed space velocity, moles total feed per litre of catalyst per hour | 244 | 238 |
| Duration of test, hours | 1 | 1 |
| Dioxane conversion, percent | 100 | 100 |
| Products formed, moles/100 moles dioxane converted: | | |
| Isoprene | 72 | 68 |
| Isobutene | 26 | 22 |
| Formaldehyde | 119 | 121 |

Example 8

A boron phosphate/silica gel catalyst was made by mixing together equal volumes of boron phosphate particles (Mesh size 22-60 B.S.S.) prepared according to Houben-Weyl, Methoden der Organischen Chemie, 4th edn., E. Muller, 1955, vol. 4/2, p. 217, with the commercial silica gel described in Example 7. The boron phosphate powder, before mixing with the silica gel, was dried for four hours at 110° C.

The catalyst was used in a process in which a mixture of two liquid volumes of water with one liquid volume of 4,4-dimethyl-1,3-dioxane was passed in the vapour phase, at 400° C. and atmospheric pressure, over the catalyst. The results are shown in Table 7.

Example 9

A catalyst was made up as described in Example 8, except that the boron phosphate particles, before mixing with the silica gel, were heat treated at 900° C. for two hours.

The catalyst was placed in a reactor maintained at 400° C., and a mixture of two liquid volumes of water with one liquid volume of 4,4-dimethyl-1,3-dioxane was passed in the vapour phase at atmospheric pressure over the catalyst. The results are shown in Table 7. After 4 hours on stream this catalyst was still giving 100% conversion.

Example 10

The process as described in Example 9 was repeated with a sample of a similar catalyst in which the boron phosphate had been treated with steam at 400° C. for 2 hours after heating. The results are shown in Table 7. After 4 hours on stream the catalyst was still giving 100% conversion.

TABLE 7

| Example | 8 | 9 | 10 |
|---|---|---|---|
| Vol. percent boron phosphate in catalyst | 50 | 50 | 50 |
| Feed space velocity, moles total reactants/litre catalyst/hour | 239 | 242 | 239 |
| Duration of test, hours | 1 | 1 | 1 |
| Dioxane conversion, percent | 100 | 100 | 100 |
| Products formed, moles/100 moles dioxane converted: | | | |
| Isoprene | 75 | 72 | 74 |
| Isobutene | 22 | 22 | 24 |
| Formaldehyde | 112 | 118 | 117 |

Example 11

A commercial crystalline boron phosphate powder (100 parts by weight) was suspended by stirring in 500 parts by volume of 2.2 N-hydrochloric acid, and 2200 parts by volume of sodium silicate solution containing 100 parts by weight of silica were rapidly added with stirring. The gel set rapidly, and was washed first with 1% ammonium chloride solution and then with water. After drying, the gel was heat treated at 350° C.

A sample of this catalyst was placed in a reactor and heated to 350° C. A mixture of 4,4-dimethyl-m-dioxane vapour and steam having a dioxane partial pressure of 100 mm. was fed to the reactor at a rate of 250 moles of total feed/litre of catalyst/hour. The total pressure being atmospheric. After 4 hours the reactant stream was stopped and the catalyst was regenerated with a mixture of air and nitrogen at a temperature not exceeding 500° C. The reaction and regeneration cycles were then repeated. The results are shown in Table 8.

TABLE 8

| Run No. | Percent Dioxane Conversion | Percent Isoprene Efficiency | Isobutene Produced (g./100 g. isoprene) | Formaldehyde Produced (g./100 g. isoprene) |
|---|---|---|---|---|
| 1 | 100 | 63.2 | 34.9 | 75.7 |
| 2 | 100 | | 32.7 | |
| 3 | 100 | 64 | 31.0 | 78.0 |
| 4 | 99 | 63.8 | 32.3 | 78.3 |
| 5 | 93.5 | 65 | 26.9 | 79.5 |
| 6 | 97.0 | 69.2 | 23.2 | 74.5 |

These results showed an improvement in isoprene efficiency and a decline in isobutene production with age of the catalyst.

A further sample of the same catalyst was steamed for 16 hours at 350° C. at a rate of 4 litres of water/litre of catalyst/hr. in order to see if the steamed catalyst would give good isoprene efficiencies in the first reaction cycle. The steamed catalyst was then used in a series of reactions identical with those described above. The results are shown in Table 9.

TABLE 9

| Run No. | Percent DMD Conversion | Percent Isoprene Efficiency | Isobutene Produced (g./100 g. isoprene) | Formaldehyde Produced (g./100 g. isoprene) |
|---|---|---|---|---|
| 1 | 100 | 66.4 | 26.4 | 78.5 |
| 2 | 98.5 | 63.7 | 26.0 | 77.0 |
| 3 | 91.3 | 68.0 | 25.0 | 71.0 |
| 4 | 97.7 | 62.5 | 24.5 | 78.0 |
| 5 | 97.7 | 64.5 | 27.0 | 78.3 |
| 6 | 96.6 | 61.0 | 26.3 | 77.5 |

These results show that the first reaction period gave results very similar to those obtained in the fifth reaction in the previous series.

Example 12

Boron phosphate particles, made as described in Example 8 were mixed with 22–60 Mesh B.S.S. Celite, a diatomaceous earth, in a proportion of 20% by volume. The catalyst was used in a process in which a mixture of two liquid volumes of water with one liquid volume of 4,4-dimethyl-1,3-dioxane was passed in the vapour phase at 400° C. and atmospheric pressure over the catalyst. The results are shown in Table 10.

TABLE 10

| Run No. | 1 |
|---|---|
| Vol. percent boron phosphate in catalyst | 17 |
| Feed space velocity, per litre Celite per hour | 238 |
| Duration of test, hours | 1 |
| Dioxane conversion, percent | 98 |
| Products formed, moles/100 moles dioxane converted: | |
| Isoprene | 72 |
| Isobutene | 20 |
| Formaldehyde | 120 |

In comparison with the above examples two processes were carried out using boron phosphate alone, and silica gel alone as catalysts. The boron phosphate particles (mesh size 22–60 B.S.S.) prepared according to Houben-Weyl, Methoden der Organischen Chemie, 4th edn., E. Muller, 1955, vol. 4/2 p. 217, were heat treated at 900° C. for two hours. The silica gel was commercial silica gel described in Example 7.

In the two processes the catalyst was placed in a reactor maintained at 400° C., and a mixture of two liquid volumes of water with one liquid volume of 4,4-dimethyl-1,3-dioxane was passed in the vapour phase at atmospheric pressure over the catalyst. The results are shown in Table 11.

TABLE 11

| Run | 1 | 2 |
|---|---|---|
| Catalyst | (¹) | (²) |
| Feed space velocity, moles/litre/hour | 238 | 239 |
| Duration of process, hour | 1 | 1 |
| Dioxane conversion, percent | <30 | 100 |
| Products formed, moles/100 moles dioxane converted: | | |
| Isoprene | 33 | 20 |
| Isobutene | 13 | 57 |
| Formaldehyde | 110 | 170 |

¹ Boron phosphate alone.
² Silica gel alone.

As can be clearly seen from the foregoing examples and tables, the advantage of the present invention lies in the use of a non-acid acting boron or aluminium phosphate catalyst. These phosphate catalysts do not give an acid reaction since they do not hydrolyse. These phosphates are not ordinary salts of phosphoric acid.

Other and further modifications and uses will be appreciated by those skilled in the art by reference to this specification and the appended claims.

I claim:
1. A process for the production of isoprene which comprises contacting in the vapor phase 4,4-dimethyl-1,3-dioxane in the presence of steam at a temperature of from 200° C. to 450° C. with non-acid acting stable to hydrolysis boron phosphate mixed with particles of a member selected from the group consisting of silica gel and diatomaceous earth, said boron phosphate being a combination of the oxides of boron and phosphorus.

2. The process as claimed in claim 1 wherein the boron phosphate is present to the extent of at least 5% by weight of the support.

3. A process for the production of isoprene which comprises contacting in the vapor phase 4,4 - dimethyl-1,3 - dioxane in the presence of steam at a temperature of from 200° C. to 400° C. with non-acid acting stable to hydrolysis boron phosphate particles mixed with silica gel particles, said boron phosphate being a combination of the oxides of boron and phosphorus, wherein boron and phosphorus are tetrahedrally surrounded by oxygen atoms.

4. The process as claimed in claim 3 wherein the boron phosphate is present to the extent of between 5 and 25% by weight of the silica gel.

5. A process according to claim 3 wherein the boron phosphate is heated at 110° for 4 hours and then mixed with silica gel of surface area 300 m.²/gm. and pore volume 1.04 cc./gm.

6. A process according to claim 3 wherein the boron phosphate is heated at 900° for 2 hours and then mixed with silica gel of surface area 300 m.²/gm. and pore volume 1.04 cc./gm.

7. A process according to claim 6 wherein the boron phosphate after heating at 900° is treated with steam at 400° for 2 hours before mixing with silica gel.

8. A process according to claim 3 wherein the boron phosphate as a powder is suspended in dilute hydrochloric acid and a suspension of silica in a solution of sodium silicate is added whereby a gel of silicic acid containing said boron phosphate suspended therethrough is formed, and said gel is heated at 350°.

9. A process according to claim 3 wherein the boron phosphate is dried for 4 hours at 110° and is then mixed with diatomaceous earth.

References Cited

UNITED STATES PATENTS

| | | | |
|---|---|---|---|
| 2,361,539 | 10/1944 | Friedricksen | 260—681 |
| 2,412,762 | 12/1946 | Workman | 260—681 |
| 2,997,509 | 8/1961 | Wirth | 260—681 |
| 3,142,712 | 7/1964 | Valet et al. | 260—681 |

FOREIGN PATENTS 589,709  6/1947  Great Britain.

OTHER REFERENCES

Moeller Inorganic Chemistry published by John Wiley and Sons, Inc. New York (1952), p. 816–7.

J. R. Van Wazer, Phosphorus and Its Compounds, volume 1, Chemistry, Interscience, New York (1958) p. 550–553.

DELBERT E. GANTZ, *Primary Examiner.*

V. O'KEEFE, *Assistant Examiner.*

UNITED STATES PATENT OFFICE
CERTIFICATE OF CORRECTION

Patent No. 3,350,474                          October 31, 1967

Max Marin Wirth

It is hereby certified that error appears in the above numbered patent requiring correction and that the said Letters Patent should read as corrected below.

Column 5, TABLE 4, fourth column, line 2 thereof, for "364" read -- 64 --; column 6, TABLE 5, second column, line 4 thereof, for "34.4" read -- 34.5 --.

Signed and sealed this 5th day of November 1968.

(SEAL)
Attest:

Edward M. Fletcher, Jr.                      EDWARD J. BRENNER
Attesting Officer                            Commissioner of Patents